United States Patent [19]

Hayashi et al.

[11] Patent Number: 4,782,390
[45] Date of Patent: Nov. 1, 1988

[54] COLOR NEGATIVE INSPECTION APPARATUS FOR DISPLAYING AND SEQUENTIALLY SHIFTING N COLOR POSITIVE IMAGES CORRESPONDING TO N COLOR NEGATIVE FRAMES

[75] Inventors: Ryoichi Hayashi; Tsutomu Kimura, both of Tokyo, Japan

[73] Assignee: Fuji Photo Film Co., Ltd., Kanagawa, Japan

[21] Appl. No.: 942,445

[22] Filed: Dec. 16, 1986

[30] Foreign Application Priority Data

Dec. 16, 1985 [JP] Japan .................... 60-281195

[51] Int. Cl.⁴ .......................... G03F 3/10; G03F 3/08; G03B 27/80; H04N 1/46
[52] U.S. Cl. ...................... 358/76; 358/78; 358/80; 355/38
[58] Field of Search .................. 358/75, 75 IJ, 76, 78, 358/80; 355/35, 38

[56] References Cited

U.S. PATENT DOCUMENTS

| | | | |
|---|---|---|---|
| 4,080,061 | 3/1978 | von Stein et al. | 355/38 |
| 4,364,084 | 12/1982 | Akimoto et al. | 358/76 |
| 4,531,150 | 7/1985 | Amano | 358/76 |

*Primary Examiner*—James J. Groody
*Assistant Examiner*—Randall S. Svihla
*Attorney, Agent, or Firm*—Young & Thompson

[57] ABSTRACT

A color negative inspection apparatus which reads color image data from a frame of a color negative film and stores in a memory color image data sequentially read from N frames of the color negative film, N being an integer at least as large as 2. The N color positive images are displayed based on the color image data stored in the memory. The N color positive images correspond to the N frames of the color negative film. The N color positive images are shifted by one frame each time color image data is read from a frame of the color negative film.

10 Claims, 4 Drawing Sheets

COLOR NEGATIVE INSPECTION APPARATUS FOR DISPLAYING AND SEQUENTIALLY SHIFTING N COLOR POSITIVE IMAGES CORRESPONDING TO N COLOR NEGATIVE FRAMES

BACKGROUND OF THE INVENTION

The present invention relates to a color negative inspection apparatus for simulating a finished print and displaying it based on a color negative image recorded on a color negative film.

An automatic photo-printing apparatus is provided with an automatic correction system by which a large area transmittance density (LATD) of a color negative is measured to automatically control the exposure amount of cyan, yellow and magenta based on the LATD value. In this case, even if the main subject of a color negative has a proper exposure, it is not correctly reproduced on a finished print because the exposure amount is influenced by too high or low density of the background image. Thus, erroneous operation of the automatic photo-printing apparatus may occur depending upon the content of a color negative, such operation being called "subject failure". It is necessary therefore for a color negative having a subject failure to be inspected using a color negative inspection apparatus prior to photo-printing so as to determine the correction amount of color and density based on the experience of an operator using the apparatus.

In a known color negative inspection apparatus, a color negative is taken with a color television camera, the photographed negative image data is subjected to an LATD correction and negative/positive conversion and is thereafter sent to a CRT to display the color image which has been automatically corrected based on the LATD value. Since the color negative inspection apparatus can simulate and display an image to be printed with an automatic photo-printing machine, it is possible to check improper negative prints beforehand. The operator checks the color and density of a color negative image displayed on a CRT. If he judges that the negative image may produce an improper finished print, a correction amount is inputted by operating a color correction key, a density correction key and the like. After inputting this correction amount, simulation of a positive print is again carried out based on the newly entered photo-printing condition to display a corrected color image on a CRT.

The conventional color negative inspection apparatus uses a single CRT for displaying a single color negative, which causes the following problem. It is common to successively take several photographs at the same place so that the color negatives have the same or similar successive scenes. It is desirable to obtain a uniform quality of finished prints in such case. However, with a conventional color negative inspection apparatus having only a single CRT, it is difficult to determine the correction amount and hence obtain a uniform quality for such successive scenes.

SUMMARY OF THE INVENTION

It is therefore an object of the present invention to provide a color negative inspection apparatus which obtains a uniform quality for successive scenes.

It is another object of the present invention to provide a color negative inspection apparatus which makes it easy to determine the correction amount.

To achieve the above objects, according to the present invention, a color image display means is provided for simultaneously displaying a plurality of successive frames of a color negative film thereon, and each time one frame has been inspected, the series of frames is advanced by one frame.

In the preferred embodiment of the invention, the color image display means may use a CRT or a liquid crystal display. One of a plurality of color image display means is used for inspection purposes, and the others are for reference purposes. The color image displayed on the inspection display means is observed to inspect it, whereas during a correction process the color images displayed on the adjacent reference display means are observed to determine the correction amount and to enable the operator to input it to the inspection system by operating a correction key. Upon input of the correction amount, a corresponding corrected color image is displayed on the inspection display means. This corrected color image is again observed and referred to the color images on the reference display means to confirm the corrected result.

The inspection display means may be mounted in an arbitrary position, but it is preferable to mount it at the middle of the plurality of display means. Such an arrangement permits the inspected color negative to be located between color negative images both before and after inspection. Therefore, an easy comparison is possible between an inspected color negative and at least one color image after inspection and having a proper color and density and at least one color image before inspection.

In another embodiment of the invention, the color image display means may use a single CRT or a liquid crystal display which displays a plurality of images.

DETAILED DESCRIPTION OF THE INVENTION

A preferred embodiment of the present invention will now be described with reference to the accompanying drawings.

Figure 1:
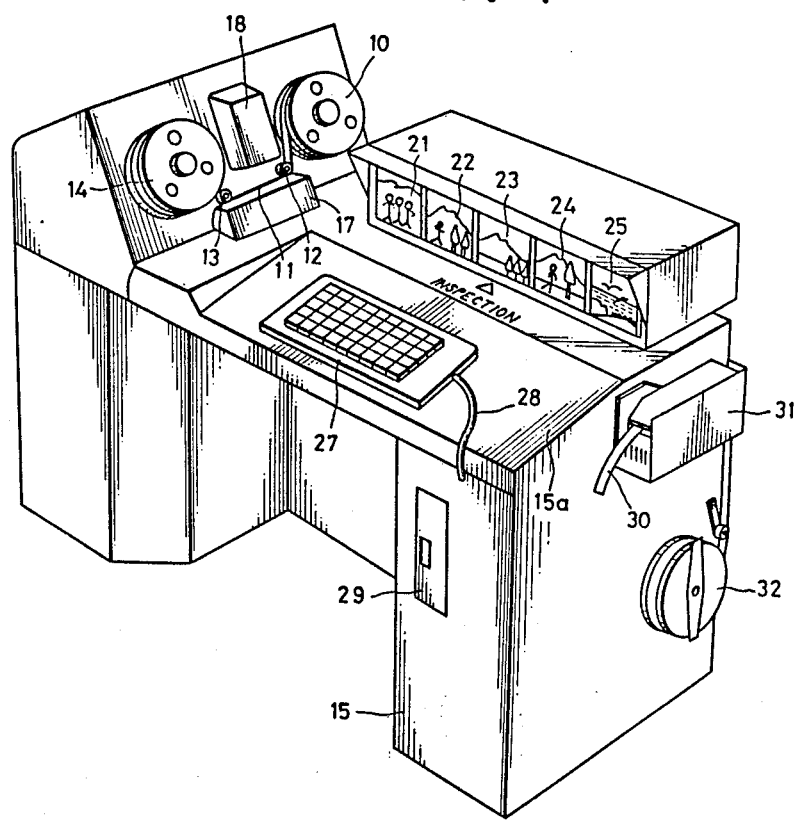
FIG. 1 is a perspective view of a color negative inspection apparatus embodying the present invention.

Referring to FIG. 1 showing the outer configuration of the color negative inspection apparatus of the present invention, a color negative film 11 wound about a supply reel 10 is transported to a take-up reel 14 via guide rollers 12 and 13. This take-up reel 14 is rotated by a motor to wind the color negative film 11 one frame after another. The supply reel 10 and take-up reel 14 are mounted detachably on an apparatus main body 15. The color negative film 11 is formed with circular notches (not shown) along at least one edge thereof.

Between the guide rollers 12 and 13, an illumination section 17 and an image reading section 18 are disposed with the color negative film 11 therebetween, a reading position being located between the two sections. The color negative film is stopped when a frame having a notch is detected so that the frame with a notch can correctly be stopped at the reading position to thereby read the color negative image of that frame by the image reading section 18.

Five CRTs 21 to 25 are disposed in a horizontal series on the apparatus main body 15 for image-processing five color negative images read from five frames and displaying positive color images. The color image displayed on each CRT 21 to 25 is simulated from an original color negative so as to have a color and density similar to those of a finished print obtained by printing the image on the CRT with an automatic photo-printing apparatus and developing it with an automatic developing apparatus. CRT 23 at the middle of the five CRTs 21 to 25 displays an inspection frame. By operating a keyboard 27 to enter the correction amount of color and density of the inspection frame image, the color and density of the image displayed by CRT 23 are corrected accordingly.

CRTs 21, 22, 24 and 25 on opposite sides of the inspection CRT 23 make it easy to perform negative inspection by referring to the successive color images displayed on these CRTs. CRTs 22 and 21 on the left side of the inspection CRT 23 display two non-inspected frames following the inspected frame. CRTs 24 and 25 on the right side of the inspection CRT 23 display the frames that were inspected before the frame undergoing inspection, and the color and density correction will be performed for those having a subject failure. Generally, the same or similar scenes appear successively and these scenes are displayed simultaneously on the CRTs. Thus, by comparing these scenes while performing a correction, it is possible to have a uniform quality of the same or similar scenes.

After negative inspection of an inspected frame displayed on the inspection CRT 23, the color negative image of a new frame is read to display it on the inspection CRT 21, while the color images already displayed on the CRTs are shifted to the right sequentially. For instance, the color image of a frame displayed on the inspection CRT 23 is displayed on the comparison CRT 24 as an image whose color and density have been corrected.

The number of CRTs is preferably decided based on the ease of negative inspection and the cost of the apparatus. Usually five CRTs may suffice. For comparison purpose, it is desirable to mount the inspection CRT at the middle of the CRT array, but a comparison CRT may be used as the inspection CRT by electrically switching the former to the latter upon request by the operator. Furthermore, CRTs 21 to 25 may be arranged vertically, or the inspection CRT 23 may be disposed at a different position which may highlight it from the other CRTs.

The keyboard 27 is placed on a table 15a of the apparatus main body 15 and connected to a microcomputer in the apparatus main body 15 which is provided with a door 29 and a system floppy controlling the microcomputer.

A puncher 31 is mounted on the right side of the apparatus main body 15, whereby data representative of a correction amount to be used in correcting a standard exposure amount determined by the automatic photo-printing apparatus, is punched on a paper tape 30. After the color negative film 11 wound about the supply reel 10 has been inspected, the puncher 31 is activated upon reception of a command from the keyboard 27 to record the correction data of each frame on the paper tape 30 supplied from a detachable supply reel 32. Instead of the puncher 31, a magnetic recording apparatus and a magnetic floppy may be used to record the correction data on the floppy.

The paper tape 30 is read to the automatic photo-printing apparatus when the color negative film 11 is printed. The read-out correction data on the paper tape 30 is processed using the automatically calculated standard exposure amount to determine a controlled exposure amount. Therefore, it is necessary to have different correction data for each different type of exposure control of the automatic photo-printing apparatus. In general, most of the apparatus is of the type controlling the exposure based on an LATD value. Thus, in this embodiment, recorded on the paper tape 30 are data which determine the exposure amount by adding to or subtracting from the standard exposure amount determined by an LATD value.

Figure 2:
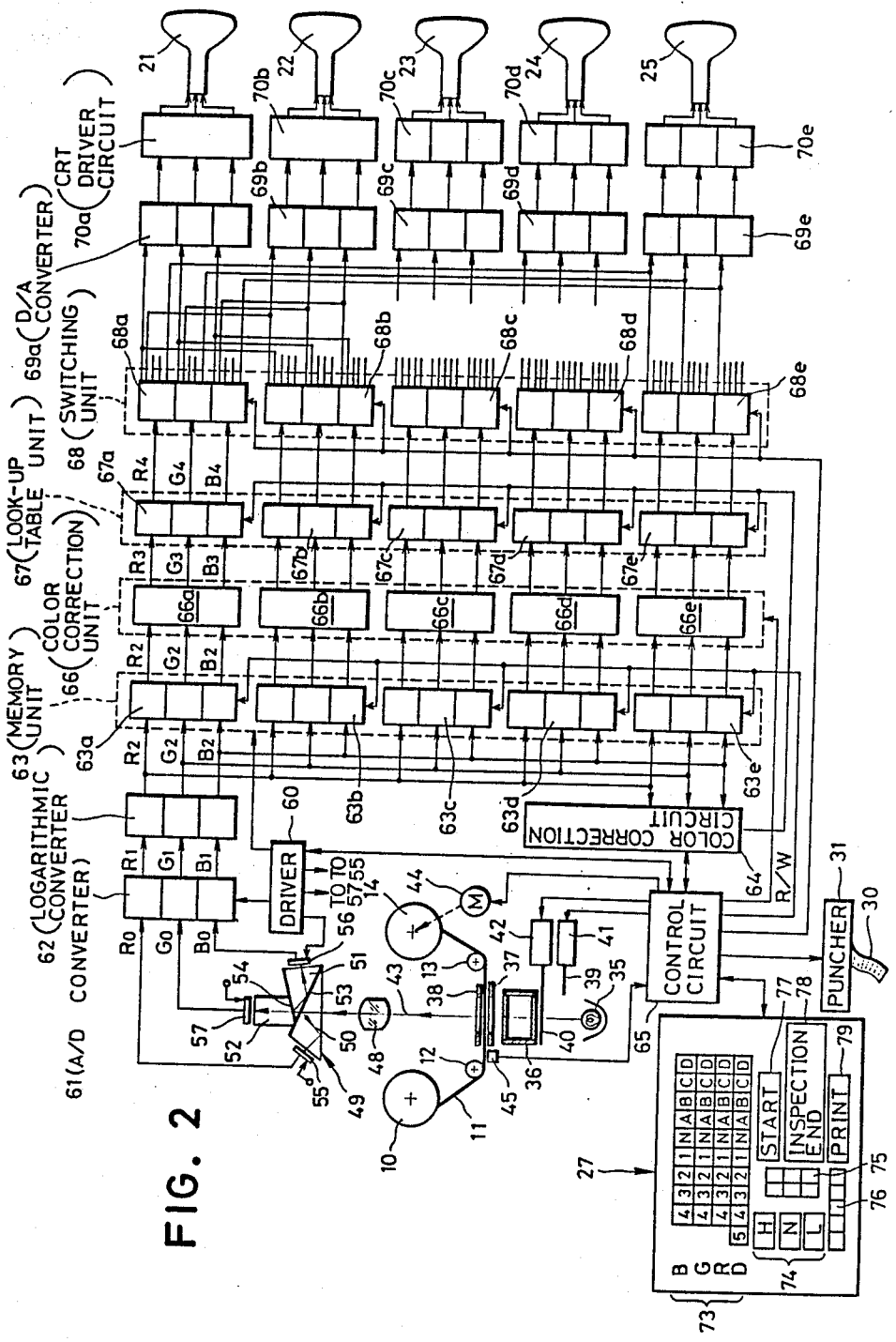
FIG. 2 is a block diagram showing an embodiment of the present invention.

FIG. 2 shows the electrical configuration of the present invention. White light emanating from a white light source 35 is diffused by a mixing box 36 and thereafter is applied to the color negative film 11 in a negative carrier 37. The color negative film 11 is pressed by a mask 38 formed with an opening having the dimensions of a frame, thus retaining the shape of a frame in the reading position. Between the white light source 35 and the mixing box 36, a plurality of ND filters are interposed. By inserting one or more ND filters into the optical path 43, the light intensity can be adjusted stepwise by a constant amount. In FIG. 2, two ND filters 39 and 40 are shown which are driven by filter drivers 41 and 42 to be inserted in the optical path 43. The take-up reel 14 is driven by a motor 44 and rotated to feed the color negative film 11 one frame after another. During the film feeding, a bar code indicating the film type and recorded on the side portion of the color negative film 11, is read by a bar code reader 45 comprising a plurality of photosensors.

A focussing lens 48 and a three color separation optical system 49 are disposed over the mask 38. The three color separation optical system 49 is comprised of three integrated prisms 50 and 52, a red reflection dichroic layer or surface 53 evaporated onto the prism 50, and a blue reflection dichroic layer or surface 54 evaporated onto the prism 51. The red reflection dichroic layer 53 reflects only red light of incident light to a red color image sensor 55. The blue reflection dichloric layer 54 reflects only blue light of incident light to a blue color image sensor 56. Green light of incident light is transmitted through the dichroic layers 53 and 54 and is directed to a green color image sensor 57. The dichroic mirrors 53 and 54 have a color separation characteristic approximately equal to the spectral sensitivity of the color paper used with the automatic photo-printing apparatus. In this embodiment, the image sensor is used, but a line sensor may be used instead. Furthermore, a stripe filter or the like may be formed before the image area sensor to read a color negative image with a single image area sensor. Furthermore, color video signals outputted from a color television camera may be used to pick up three color signals (R0, G0, B0) through a color separation circuit.

The image sensors 55 to 57 may be of the CCD type, MOS type and the like, there being focussed on the light-receiving surface thereof a monochromatic image obtained through color separation by the three color separation optical system 49. The image sensors 55 to 57 are driven by a driver 60 to photoelectrically convert each pixel of the incident monochromatic image into a time sequential signal (R0, G0, B0), including red R, green G and Blue B. The three color signals (R0, G0, B0) are converted by respective A/D converters 61 into digital signals. The obtained image data (R1, G1, B1) are converted by respective logarithmic converters 62 into density signals (R2, G2, B2) which are sent to a memory unit 63 and a color correction circuit 64. The driver 60 sends sampling signals synchronized with the reading of the image sensors 55 to 57 to the A/D converter 61, and synchro signals identifying the position of pixel to the memory unit 63.

The memory unit 63 is constructed of five frame memories 63a to 63e for storing the data of five images, each frame memory 63a to 63e storing the image data of a color-separated single frame. When a new color negative image is read, it is written into the frame memory which stored the first-read color negative image of the previous five frames. The read/write operation of this memory unit 63 is controlled by a control circuit 65 comprised by a microcomputer. The image data of five frames stored in the memory unit 63 are sent to a color correction unit 66 which is comprised by five color correction circuits 66a to 66e respectively corresponding to the frame memories 63a to 63e. The color correction circuits perform the following calculation:

$$\begin{bmatrix} R3 \\ G3 \\ B3 \end{bmatrix} = \begin{bmatrix} R2 \\ G2 \\ B2 \end{bmatrix} \times \begin{bmatrix} a11 & b12 & c13 \\ a21 & b22 & c23 \\ a31 & b32 & c33 \end{bmatrix} \quad (1)$$

This color correction is made to compensate for the difference between the spectral sensitivity of the photographic paper and the spectral transmittance of the color separation optical system 49. This color correction may be omitted if the above-described dichroic mirrors 53 and 54 have performed such a correction. The color correction circuits 66a to 66e are comprised by look-up table memories storing the coefficients a, b and c, and adders. The coefficients are written into the table using the control circuit 65.

The image data (R3, G3, B3) on five frames subjected to color correction as described previously are sent to a look-up table unit 67 wherein the image data are subjected to a negative/position conversion and a color and density correction for each frame. The look-up table unit 67 is constructed of five look-up table memories 67a to 67e, each of which has three red, green and blue table data written therein for each frame. By referring to these table data, signal conversion of the image data (R3, G3, B3) is conducted to thereby correct the color and density of the color image for each frame displayed on each CRT 21 to 25.

The color- and density-corrected image data (R4, G4, B4) read out from each look-up table memory 67a to 67e are sent to a switching unit 68, whereby each color image is shifted one CRT to the right every time one frame negative inspection has been completed. The switching unit 68 is constructed of five switching circuits 68a to 68e, each switching circuit 68a to 68e being comprised by three red, green and blue demultiplexers.

Image data (R4, G4, B4) for each frame switched by the switching unit 68 are sent to a designated one of D/A converters 69a to 69e to be converted into an analog signal. The obtained five frame analog signals are then sent to CRT driver circuits 70a to 70e which drive CRTs 21 to 25 to display the color images.

The keyboard 27 includes a color and density correction key means 73, a correction level key means 74, a function key 75, a color paper type input key 76, a start key 77, a negative inspection end key 78, and a print key 79. The color and density correction key means 73 is comprised by red color correction keys, green color correction keys, blue color correction keys, and density correction keys, which are operated when the operator judges that an inspected frame has a subject failure, based upon his observation of the inspection CRT 23 with reference to the comparison CRTs 21, 22 and 24, 25. When the correction key means 73 is operated, table data for each color written in the look-up table memory such as designated by 66a coupled to the inspection CRT 23, are corrected so that the color image on the inspection CRT 23 is corrected to the color and density designated by the correction key means 73. "N" represents that the key step number is zero and no correction is effected, while for example "D" represents that the key step number is minus 4 and correction by the amount corresponding to the number 4 is effected in the negative direction. With a color negative inspection apparatus of the type wherein a color negative film is checked directly, a cyan correction key, a magenta correction key, and a yellow correction key are used. However, in the present invention, the red, green and blue correction keys are used because a positive image is displayed on a CRT.

The correction level key means 74 is comprised by a high correction key, a normal correction key, and a low correction key, and they are used in place of the color correction key. The high correction key is operated if the inspected frame is photographed under a different light source such as a tungsten light. In this case, the correction is made so as to make the difference large between the average value (white LATD value) of three color LATD values and each LATD value. The low correction key is operated if the inspected frame has a possibility of a subject failure because of a large area of a specified color in the frame. In this case the correction is made so as to make the difference small between the white LATD value and each LATD value. The normal correction key is not used for correction of the LATD value.

The function keys 75 are provided for the purpose of simplifying the input operation of the color correction. Thus, the keys are used only for a scene which frequently recurs. Upon operating these keys, the same color correction function as that obtained when operating a plurality of color correction keys, can be performed.

The color paper type input key 76 is provided for identifying the color paper used with the automatic photo-printing apparatus. In accordance with color paper type information supplied by operating this key, the coefficients of the formula calculated by the color correction unit 66 are selected from the predetermined coefficients.

The start key 77 is operated at the start of negative inspection to initiate the control circuit 65. The negative inspection end key 78 is operated every time one frame inspection is completed. Upon operation of the negative inspection end key 78, the color negative film 11 is transported to place the next frame in the reading position. The print key 79 is operated when the color negative film has been completely inspected. Upon operation of the print key 79, the puncher 31 is energized to record the correction data for each frame on the paper tape 30.

Figure 3:
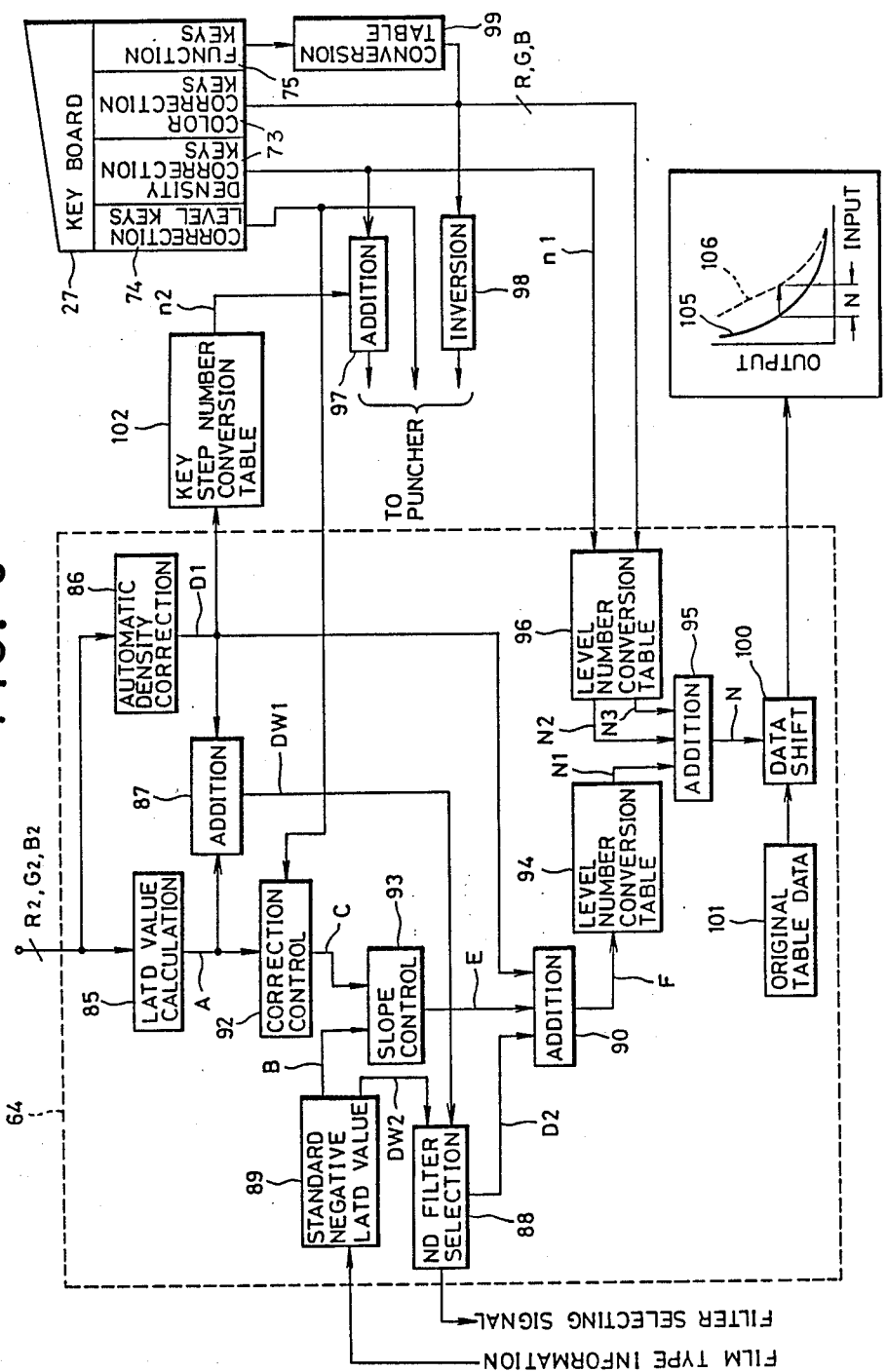
FIG. 3 is a functional block diagram illustrating an example of the color correction circuit.

FIG. 3 is a block diagram illustrating the function of the color correction circuit 64 shown in FIG. 2. The color correction circuit 64 is comprised by a microcomputer. The image data outputted from the logarithmic converter 62 are subjected to an arithmetic averaging operation by an LATD value calculation circuit 85 independently for each color to calculate three color LATD values A (DR1, DG1, DB1).

The number of frames having a subject failure is generally about one third of all frames. The color correction for these frames requires the operator to perform considerable work of negative inspection. For this reason, in the present embodiment, an automatic density correction circuit 86 is provided which can reduce the number of corrections performed by the operator to about one twentieth of all the frames. The automatic density correction circuit 86 is provided with the image data (R2, G2, B2) so that the density correction value D1 (the same for all three colors) can be calculated using the specific density value such as the maximum or minimum density value. An adder 87 first calculates the average value (white LATD value) based on the respective color LATD values, and adds the average value to the density correction value D1 to calculate the white density value DW1. This addition operation is carried out because of the logarithmic white LATD value, but in case of an antilogarithmic value, a multiplication operation is carried out instead. This is also true for the operation described below.

The white color density value DW1 is sent to an ND filter selection unit 88 and compared with a white color LATD value DW2 of a standard negative film stored in a standard negative LATD value memory 89, thereby to produce a filter selection signal responsive to which an ND filter makes the two values become equal or approximately equal. The filter selection signal is sent to the control circuit 65. Simultaneously therewith, the density value D2 of the selected ND filter is outputted and sent to an adder 90. The control circuit 65 energizes one of the filter drivers 41 and 42 to insert the corresponding ND filter into the optical path 43. The standard negative LATD value memory 89 stores data corresponding to the type of film, from which are outputted three color LATD values B (DR2, DG2, DB2) corresponding to the film type information read by the bar code reader 45 and the white color LATD value DW2 which is the average value of the three color LATD values.

The three color LATD values A (DR1, DG1, DB1) outputted from the LATD value calculation circuit 85 are sent to a correction control unit 92, wherein the values A are respectively multiplied by the correction coefficients designated by the correction level key means 74 of the keyboard 27 thereby to convert them into three color density values C (DR3, DG3, DB3). The obtained three color density values C (DR3, DG3, DB3) are sent to a slope control unit 93. The correction level key means 74 is comprised by a high correction key, a normal correction key, and a low correction key. Therefore, when the high correction key is actuated, the color correction is effected so as to make the difference large between the white LATD value and each color LATD value. When the low correction key is turned on, color correction is effected to make the difference small. On the other hand, when the normal correction key is turned on, the correction coefficients are all zero.

The slope control unit 93 is used for automatically correcting color negative images of under-exposure or over-exposure, so that they have a proper density. The three color density values C (DR3, DG3, DB3) are respectively substracted from the three color LATD values B (DR2, DG2, DB2) of the standard negative to obtain differences (DR4, DG4, DB4) therebetween. Each difference is multiplied by a specified, predetermined coefficient assigned to each of a plurality of groups into which the difference is classified, thereby to obtain three color density values E (DR5, DG5, DB5). For instance, if the red color density difference DR4 is positive, it is multiplied by "1.1", whereas if it is negative, the difference DR4 is multiplied by "0.9". The three color density values E (DR5, DG5, DB5) calculated by the slope control unit 93 are sent to an adder 90. The correction control circuit and the slope control unit 93 have the same function implemented in a conventional LATD type automatic photo-printing apparatus.

The adder 90 adds the three color density values E (DR5, DG5, DB5), the density correction value D1 and the filter density value D2 independently for each color to calculate three color density values F (DR6, DG6, DB6).

$$DR6 = DR5 + D1 + D2$$

$$DG6 = DG5 + D1 + D2$$

$$DB6 = DB5 + D1 + D2 \qquad (2)$$

The three color density values F are sent to a level number conversion table 94 wherein the values are converted into the level numbers which are used to shift original table data for each color read out from a memory 101 in order to correct gradation of the color image. Signals N1 (NR1, NG1, NB1) representative of the level number are sent to an adder 95. In converting the level number, since it has been previously decided that the original tabe data are to be shifted by "50" in units of level numbers for the case of a density difference of "0.3" for example, the signal N1 is obtained by dividing the density difference by "0.3" and multiplying the result by "50".

When the density correction key 73 of the keyboard 27 is operated, the signal n1 representative of the key step number is sent to another level number conversion table 96 and another adder 97. When the color correction key 73 is operated, the key step number of the operated color correction key is sent to the level number conversion table 96 and an inverter 98. Since the function key 75 is operated instead of three color correction keys, after converting the input of the function key 75 into a signal representing the color correction key step number by the conversion table 99, the key step number is sent to the level number conversion table 96 and the inverter 98.

The level number conversion table 96 outputs signal N2 corresponding to the operated density correction key step number n1 and signals N3 (NR3, NG3, NB3) corresponding to the operated color key step number to send them to the adder 95. For instance, assuming that the level number per one key step of the density correction key is "16", upon operating the density correction key whose step number is "3", the step level number conversion table 96 outputs signal N2 representative of the level number "48". Assuming that the level number per one key step of the color correction key is "8", signals N3 become (0, −8, 16) in the case of "A" of the green correction key and "2" of the blue correction key. The level number per one key step is determined based on experiments.

The adder 95 calculates the level numbers N (NR, NG, NB) using the following formulas and sends the results to a data shift circuit 100:

$$NR = NR1 + N2 + NR3$$

$$NG = NG1 + N2 + NG3$$

$$NB = NB1 + N2 + NB3 \quad (3)$$

For instance, let it be assumed that N1 is (0, 15, −30), N2 is "96", and N3 is (0, −8, 16). The level numbers N (NR, NG, NB) become (96, 103, 82). The data shift circuit 100 shifts each original table datum read out from the memory 101 by the amount of the level numbers N. For instance, the red table data are shifted by "96", the green table data are shifted by "103", and the blue table data are shifted by "82" in gradation steps as compared with each original table data. The table data shifted for each color are written into the look-up table memory coupled to the frame memory storing the inspected frame image data. In this case, if the original table data have been written in the look-up table memory provided with a shift circuit at the input side thereof, the input signal to the shift circuit may be shifted by N units of level numbers. As a result, the write operation into the look-up table memory at that time is not needed, thus resulting in a high speed color correction process.

The inverter 98 inverts the signs of the input of the color correction key of the keyboard 27 to convert into the key step numbers of the cyan correction key, magenta correction key or yellow correction key. Let it be assumed that the operated red correction key is "N", the green correction key is "A", and the blue correction key is "2". The color correction amount (the key step number of the cyan, magenta, and yellow correction keys) becomes (N, 1, B), and the data representative of this are sent to the puncher 31.

In the case wherein a density correction value D1 is outputted from the automatic density correction circuit 86, the density correction value D1 is sent to the key step number conversion table 102 to convert it into the key step number n2. In the above-described example having a density correction value of "0.3", the level number is "50" corresponding to about "3" in units of key steps. Therefore, if the density correction value has a value of "0.1", then n2 becomes "1". The key step number n2 is sent to the adder 97 to add it to the density correction key step number n1, the sum being sent to the puncher 31 as a density correction datum.

The puncher 31 is provided with correction data including the cyan correction key step number, magenta correction key step number, yellow correction key step number, density correction key step number, and the type of correction level key. These correction data are punched on the paper tape 30. For instance, assuming that the outputs of the inverter 98 are (N, 1, B), the output of the adder 97 is "4", and the high correction key is being turned on, then the correction data (N, 1, B, 4, H) for the inspected frame are recorded on the paper tape 30.

Next, the operation of the above-described embodiment will be described. First, a color negative film wound in a roll about the supply reel 10 is mounted on the apparatus main body 15. Upon turning on the power supply for the apparatus, the control circuit shown in FIG. 2 clears the data in the memory unit 63, color correction unit 66, and look-up table unit 67 and activates them. The paper type input key of the keyboard 27 is operated to input the information on the type of color paper to be used for the automatic photo-printing apparatus. The control circuit 65 selects the coefficients aij, bij, cij of the formula (1) in accordance with the color paper type information and writes them into the color correction unit 66.

Upon operating the start key 77, the control circuit 65 drives the motor 44 to rotate the take-up reel 14. When the frame with a notch comes to the reading position, the motor 44 is stopped. The image sensors 55 to 57 started reading the image at a predetermined period from the time the power was turned on, and carrying out a three color separation light measurement when the first frame reaches the reading position. Specifically, the color negative image on the first frame is color-separated into red, green and blue color images by the three color separation optical system 49, and each monochromatic image is received by each image sensor 55 to 57 which converts each pixel of the incident monochromatic image into a time sequential signal and outputs it. The red signal R0, green signal G0 and blue signal B0 outputted from the image sensors 55 to 57 are converted into digital signals by the A/D converter 61 and further converted into the image data (R2, G2, B2) by the logarithmic converter 62.

The image data (R2, G2, B2) are sent to the LATD value calculation unit 85 of the color correction circuit 64 shown in FIG. 3, wherein each color LATD value is calculated. The specific values of the image data (R2, G2, B2) are derived by the automatic density correction circuit 86, and the density correction value D1 is outputted based on the derived specific values. The white density DW1 is calculated from the density correction value D1 and the LATD values A, the white density DW1 being sent to the ND filter selection unit 88. The bar code reader 45 mounted before the reading position reads the bar code recorded on the side end of the color negative film 11. The control circuit 65 decodes the bar code to output the film type information and sends it to the standard negative LATD value memory 89. The memory 89 outputs the three color LATD values B and the white LATD value DW2 of the standard negative film in accordance with the film type information. The ND filter selection unit 88 outputs a filter selection signal by which is selected an ND filter which makes the white density value DW1 equal to or approximately the same as the white LATD value DW2 of the standard negative, and sends a corresponding signal to the control circuit 65. The control circuit 65 drives the filter driver such as 41 corresponding to the selected ND filter to insert the ND filter 39 into the optical path 43. The ND filter then adjusts the quantity of incident light to each image sensor 55 to 57.

After inserting the ND filter 39 into the optical path 43, the control circuit 65 starts writing into the memory unit 63 at times synchronized with the reading of the driver 60. The frame memory 63a is selected to write the image data (R2, G2, B2) of each pixel of the first frame measured when the ND filter 39 is inserted.

The three color LATD values A outputted from the LATD value calculation memory 85 are sent to the correction control unit 92 wherein they are corrected in accordance with the input from the correction level key means 74 of the keyboard 27. The corrected three color density values C are further corrected to the three color density values E in the slope control unit 93, the latter values being sent to the adder 90. The adder 90 adds together the density value D2 of the ND filter 39, the density correction value D1 outputted from the automatic density correction circuit 86, and the three color density values E outputted from the slope control unit 93 and outputs the resultant three color density values F.

The three color density values F are converted into the level number N1 by the level number conversion table 94, which number is used for shifting the original table data and is sent to the adder 95. The negative inspection starts after reading three frame color negatives so that the level number outputted from the level number conversion table is "0" for both step numbers N2 and N3. Therefore, the level number N1 outputted from the level number conversion table 94 is sent to the data shift circuit 100 to shift the original table data for each color stored in the original table data memory 101 by N1 in units of level numbers. The obtained table data for each color is written into the look-up table memory 67a. In other words, a gradation curve showing the original table data 106, which is obtained by shifting a gradation curve showing the original table data 105 of a color paper (the curve is different for each color) by N (equal to N1) in units of level numbers, is written in the look-up table memory 67a.

The image data (R2, G2, B2) written in the frame memory 63a separately for each color are subjected to correction of the difference between the spectral sensitivity of the color paper and the spectral transmittance of the three color separation optical system 49 in the color correction circuit 66a, and thereafter the corrected data (R, G3, B3) are sent to the look-up table memory 67a wherein the data are subjected to color correction, density correction, and negative/positive conversion. The image data (R4, G4, B4) outputted from the look-up table memory 67a are sent to the switching circuit 68a. The control circuit 65 then connects the switching circuit 68a to the D/A converter 69a because the frame to be displayed is the first frame. The D/A converter 69a converts the image data (R4, G4, B4) into an analog signal and sends this signal to the CRT driver circuit 70a to display the first frame color image as a positive image on the comparison CRT 21.

After image processing for the first frame, the control circuit 65 drives the motor 44 to set the second frame in the reading position, and inserts the ND filter into the optical path in the same manner as described above to read the color negative image, which is written into the second frame memory 63b. Each table datum is written into the look-up table 67b based on the second color negative image.

During or after writing into the frame memory 63b, the control circuit 65 makes the switching circuit 68a connect to the D/A converter 69b and the switching circuit 68b to the D/A converter 69a. As a result, the first frame image data stored in the frame memory 63a are sent to the comparison CRT 22 after color correction and density correction, on which CRT the first color negative image reversed into a positive image is displayed. On the other hand, the second frame image memory stored in the frame memory 63b is sent to the comparison CRT 21 after color correction and density correction.

Thereafter, in the same manner as described before, the third frame color negative image is read and written into the frame memory 63c. After completion of this write operation, the switching unit 68 is actuated to display the first frame on the inspection CRT 23, the second frame on the comparison CRT 22, and the third frame on the comparison CRT 21. In this state, after completion of reading the third frame, negative inspection for the first frame becomes possible.

On the inspection CRT 23, a color image is displayed through simulation for the LATD correction and the correction by the automatic density correction circuit 86. Observing the color image on the inspection CRT 23, the operator checks if the color image is such as to produce a proper finished print or not. If the color and density of the color image is proper, the negative inspection end key 78 is depressed. If not, the correction key (correction level key, density correction key, color correction key, or function key) of the keyboard is operated. With the correction level key means 74 operated, the three density values C change so that the level number N1 of the level number conversion table 94 changes. With the density correction key 73 operated, the level number N2 corresponding to the depressed key step number is outputted from the level number conversion table 96. With the color correction keys 73 provided for each of red, green and blue color operated, the level number conversion table 96 outputs the level number N3. Furthermore, upon the function key 75 being operated, the data are converted into the predetermined level number of the color correction key 73 by the conversion table 99 and sent to the level number conversion table 96.

As described previously, if the density correction and color correction are designated manually upon operating the correction keys 73, a calculation by the formulas (3) is carried out by the adder 95 to obtain the level number N. In accordance with this new level number N, the original table data are shifted and are written in the look-up table memory 67a. This renewed data table corrects the first frame image data stored in the frame memory 63a and displays it on the inspection CRT 23. Observing the corrected first frame color image displayed on the inspection CRT 23, the operator checks if the correction has been properly made. If proper, the negative inspection end key 78 is operated. If not, the correction keys are again operated to change the table data in the look-up table memory 63a to again effect the correction of the color image.

After completion of the first frame negative inspection and operating the negative inspection end key 78, the correction data representative of the density, color and correction mode are sent to the puncher 31 to be stored in the puncher memory. In particular, the density correction value D1 outputted from the automatic density correction circuit 86 is converted into the level number density key step number n2 and is added to the key step number of the density correction key, thereby to send the resultant key number to the key puncher 31. The key step numbers of the red, green and blue correction keys, respectively obtained by operating the color correction key or the function key 75, are converted into the key step numbers of the cyan correction key, magenta correction key, and yellow correction key, by the reverser or inverter 98 thereby to send them to the puncher 31.

After the above correction data are sent to the puncher 31, reading the fourth frame color negative image is performed and the obtained image data are written into the frame memory 63d. During or after the write operation, the switching unit 68 is actuated. Consequently, the fourth frame color image is displayed on the comparison CRT 21, the third frame color image on the comparison CRT 22, and the second frame color image on the inspection CRT 23. The first frame color image after density and color correction is displayed on the comparison CRT 24. The negative inspection of the second frame is carried out similarly to the first frame negative inspection. In this case, if the correction is not sufficient, the table data in the look-up table memory 67b is renewed to correct the second frame color image displayed on the inspection CRT 23.

After the second frame negative inspection and operating the inspection end key 78, the correction data are sent to the puncher in the manner described previously. Then, reading the fifth frame color negative image starts and the obtained image data are written in the frame memory 66e. In this case, the first to fourth color images displayed on the CRTs 21 to 24 are shifted to the CRTs on the right side, respectively. Then, the third frame color image displayed on the inspection CRT 23 is inspected.

After completion of the third frame negative inspection, reading the sixth frame color negative image starts. The sixth frame image data is written in the frame memory which stored the first frame image data. The seventh frame image data is written into the frame memory 63b which stored the second frame image data. In a similar manner, new image data are written into the frame memory connected to the comparison CRT 25.

When negative inspection for all frames of the film wound about the supply reel 10 has been completed, the print key 79 is operated. Then, the correction data for each frame stored in the memory of the puncher 31 are recorded on the paper tape 30 in the form of punching code. This paper tape 30 is fed to the automatic photo-printing apparatus when the inspected color negative film is to be printed on a color paper. With this automatic photo-printing apparatus, the correction data read from the paper tape 30 and the LATD value read by the light-receiving apparatus are used for control of the exposure amount of red, green and blue light, so that the same image as the color image displayed on the inspection CRT 23 is printed on the color paper in the form of a latent image.

Figure 4:
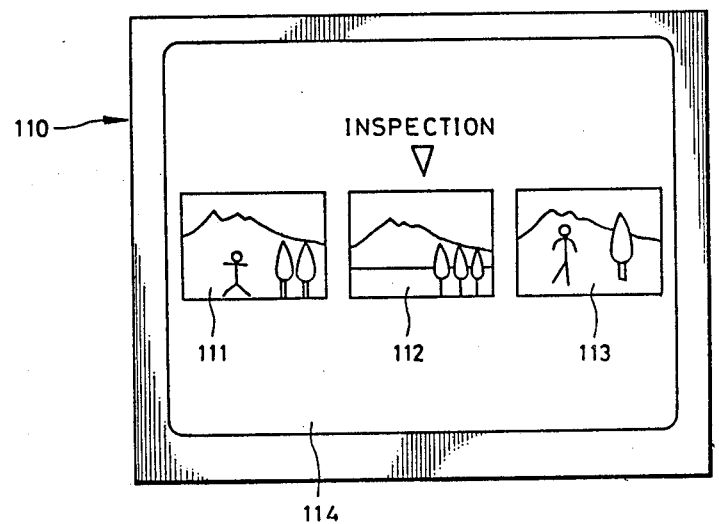
FIG. 4 is a front view of a single CRT showing another embodiment of the present invention.

Referring to FIG. 4 showing another embodiment of the invention, a single CRT 110 is used as a color image display means which displays three color images 111 to 113 on display surface 114 thereof. The images 111 to 113 are shifted to the right after the center image 112 has been inspected.

In this invention, a color compensating filter device disposed between a light source 35 and mixing box 36 can be used for color correction instead of electrical correction. The color filter device has a cyan filter, a magenta filter and a yellow filter, each filter being inserted into optical path 43 in response to the correction amount.

As described so far, according to the present invention, a color image display means is provided to display the inspection frame as well as the frames before and after the inspection frame. Therefore, it is possible to determine the correction amount of the inspecting frame by referring to the color and density of the adjacent frames. Thus, even a beginner can conduct negative inspection properly and determine the correction amount so as to obtain uniformly finished prints for the same or similar scenes.

Furthermore, by mounting a color image display means for use in displaying the frame to be inspected at the middle of the apparatus, it is possible to readily and simultaneously observe the corrected frames and the frames not yet corrected, thus making possible an easy negative inspection.

What is claimed is:

1. A color negative inspection apparatus comprising:
   means for reading color image data from a frame of a color negative film;
   memory means for storing color image data sequentially read from N frames of said color negative film by said reading means, N being an integer at least as large as 2;
   color image display means for displaying N color positive images based on said color image data stored in said memory means, said N color positive images corresponding to said N frames of said color negative film; and
   means for shifting one color positive image by one frame each time color image data is read from a frame of said color negative film by said reading means.

2. A color negative inspection apparatus according to claim 1, wherein said color image display means is a single color CRT which displays a plurality of color images on a display surface thereof.

3. A color negative inspection apparatus according to claim 1, wherein said color image display means is a plurality of color CRTs each of which displays a color image on display surface thereof.

4. A color negative inspection apparatus comprising:
   means for reading color image data from a frame of a color negative film;
   N frame memories for storing color image data sequentially read from N frames of said color negative film by said reading means, N being an integer at least as large as 2;
   N correction means for correcting said color image data stored in said N frame memories;
   means for setting amounts by which said N correction means correct said color image data stored in said N frame memories;
   N color image display means for displaying N color positive images based on said color image data stored in said N frame memories as corrected by said N correction means, said N color positive images corresponding to said N frames of said color negative film; and
   means for shifting one color positive image by one frame each time color image data is read from a frame of said color negative film by said reading means.

5. A color negative inspection apparatus according to claim 4, wherein each of said N color image display means is a CRT, and said N CRTs are disposed in an array.

6. A color negative inspection apparatus according to claim 5, wherein said shifting means comprises N switching circuits for electrically connecting corresponding ones of said N correction means to desired ones of said N CRTs.

7. A color negative inspection apparatus according to claim 6, wherein said each of said N correction means is a look-up table memory.

8. A color negative inspection apparatus according to claim 7, wherein color image data newly read from a frame of said color negative film by said reading means is stored in the one of said N frame memories in which the color image data corresponding to the color positive image being displayed at that time on the Nth CRT is stored.

9. A color negative inspection apparatus according to claim 8, wherein one of said N CRTs is designated as an inspection CRT, and wherein said means for setting correction amounts comprises:
- memory means for storing original table data;
- auto correction means for calculating auto correction information for a given frame of said color negative film on the basis of color image data read from said given frame by said reading means;
- correction key means for inputting manual correction information for said given frame;
- means for adding said auto correction information to said manual correction information to obtain added correction information;
- means for reading out said original table data from said memory means and for shifting said read-out original table data in accordance with said added correction information; and
- means for writing said shifted original table data into one of said N look-up table memories corresponding to one of said N CRTs on which a given color positive image corresponding to said given frame is displayed;
- wherein said manual correction information is set to zero when color image data is newly read from said given frame by said reading means, and wherein said correction key means is operated to input manual correction information for said given frame while said given color positive image corresponding to said given frame is displayed on said inspection CRT.

10. A color negative inspection apparatus according to claim 9, wherein said correction key means includes a plurality of density correction keys, a plurality of color correction keys, a plurality of correction level keys, and a plurality of function keys.

* * * * *